United States Patent [19]

Bansleben et al.

[11] Patent Number: 5,082,878

[45] Date of Patent: Jan. 21, 1992

[54] SHRINK CONTROLLED LOW-TEMPERATURE-CURABLE POLYESTER RESIN COMPOSITIONS

[75] Inventors: Donald A. Bansleben; Joseph M. Daly, Columbia, both of Md.; Emil Zavadsky, Aigle, Switzerland

[73] Assignee: W.R. Grace & Co.-Conn, New York, N.Y.

[21] Appl. No.: 634,780

[22] Filed: Dec. 27, 1990

Related U.S. Application Data

[63] Continuation of Ser. No. 337,018, Apr. 12, 1989, abandoned, which is a continuation-in-part of Ser. No. 181,942, Apr. 15, 1988, abandoned.

[51] Int. Cl.$^5$ .............................................. C08L 67/06
[52] U.S. Cl. ..................... 523/203; 523/502; 523/514; 523/515; 523/516; 523/521; 523/523; 523/527; 525/166; 525/170
[58] Field of Search ............... 525/166, 170; 523/523, 523/203, 507, 514, 515, 516, 521, 527; 524/451

[56] References Cited

U.S. PATENT DOCUMENTS

| | | |
|---|---|---|
| Re. 31,975 | 8/1985 | Comstock ............................ 523/514 |
| 3,437,619 | 4/1969 | Nutt . |
| 3,629,169 | 12/1971 | Bedighian . |
| 3,733,285 | 4/1973 | Steffy . |
| 3,779,966 | 12/1973 | Weeks et al. . |
| 4,038,341 | 7/1977 | Schwartz, Jr. . |
| 4,059,551 | 11/1977 | Weiant et al. . |
| 4,077,931 | 3/1978 | Leitheiser et al. . |
| 4,102,944 | 7/1978 | Fukuyama et al. . |
| 4,110,278 | 8/1978 | Demmler et al. . |
| 4,115,336 | 9/1978 | Crouzet . |
| 4,204,988 | 5/1980 | Crouzet . |
| 4,212,790 | 7/1980 | Ibata ..................................... 525/39 |
| 4,228,251 | 10/1980 | Maekawa et al. . |
| 4,233,413 | 11/1980 | Monma et al. . |
| 4,245,068 | 1/1981 | Brewbaker et al. . |
| 4,309,519 | 1/1982 | Obara et al. . |
| 4,346,050 | 8/1982 | Trent et al. . |
| 4,371,639 | 2/1983 | Muszynski . |
| 4,375,489 | 3/1983 | Muszynski . |
| 4,504,318 | 3/1985 | Matsuda et al. . |
| 4,524,162 | 6/1985 | Domeier . |
| 4,540,726 | 9/1985 | Sugama et al. . |
| 4,608,280 | 8/1986 | Robinson et al. . |
| 4,611,015 | 9/1986 | Hefner, Jr. et al. . |
| 4,737,538 | 4/1988 | Halper et al. . |
| 4,743,415 | 5/1988 | Crouzet . |
| 4,816,503 | 3/1989 | Cunningham ........................ 523/521 |

FOREIGN PATENT DOCUMENTS

| | | |
|---|---|---|
| 67690 | 12/1982 | European Pat. Off. . |
| 75765 | 4/1983 | European Pat. Off. . |
| 136920 | 4/1985 | European Pat. Off. . |
| 150624 | 8/1985 | European Pat. Off. . |
| 223592 | 5/1987 | European Pat. Off. . |
| 224370 | 6/1987 | European Pat. Off. . |
| 2729553 | 1/1979 | Fed. Rep. of Germany . |
| 59-126420 | 7/1984 | Japan . |
| 62-12934 | 3/1987 | Japan . |
| 825135A | 5/1983 | South Africa . |
| 1065053 | 4/1967 | United Kingdom . |
| 1157292 | 7/1969 | United Kingdom . |
| 1407849 | 9/1975 | United Kingdom . |
| 2017673 | 10/1979 | United Kingdom . |
| 2087416 | 5/1982 | United Kingdom . |
| 8501948 | 5/1985 | World Int. Prop. O. . |
| 8704442 | 7/1987 | World Int. Prop. O. . |

OTHER PUBLICATIONS

Union Carbide Corp., "Technical Information: Neulon TM Polyester Modifier 'T'", (1984).

Union Carbide Corp., brochure entitled: "Neulon Polyester Modifier T".

E. Hackel; Fette, Seifen, Asntrichn., 72(12), 1053 (1970).

Cement and Concrete Research, 11, 429 (1981), T. Sugama, L. E. Kukacka, and W. Horn.

J. Macromol. Sci.-Chem., A21 (6-7(, 775 (1984), H. Matsuda and T. Saheki.

Y. Ohama, M. Sugi, and M. Hamatsu, "5th International Congress on Polymers in Concrete Proceedings", Brighton, U.K., Sep. 22-24 (1987), p. 113.

*Primary Examiner*—Patricia Short
*Attorney, Agent, or Firm*—Chester Cekala; William L. Baker

[57] ABSTRACT

New shrinkage control agents, for unsaturated polyester resin systems, which are copolymers of vinyl versatate and vinyl acetate, i.e., poly(vinyl versatate-co-vinyl acetate). The shrink control agents are useful both with neat and filled unsaturated polyester resin systems. The shrink control agents are especially useful under conditions where the unsaturated polyester resin system is cured at or below ambient temperatures.

34 Claims, No Drawings

SHRINK CONTROLLED LOW-TEMPERATURE-CURABLE POLYESTER RESIN COMPOSITIONS

This is a continuation of co-pending application Ser. No. 07/337,018, filed on Apr. 12, 1989, now abandoned, which is a continuation-in-part of application Ser. No. 181,942, filed Apr. 15, 1988, now abandoned.

BACKGROUND OF THE INVENTION

The present invention relates to unsaturated polyester resin compositions which exhibit extremely low shrink, no shrink or even an expansion upon curing. The invention more particularly relates to shrink-controlled low temperature (about 0° C. to about 50° C.) curable compositions containing unsaturated polyester ("UPE") resin. The compositions are useful in a wide variety of contexts, such as pourable, self-levelling floorings, trowellable mortars, and joint sealing.

The fact that certain polymers shrink during curing is well documented. Unsaturated polyester resins, to which this invention is directed, commonly shrink from 5-15% in volume upon cure. Although such shrinkage can be tolerated in many situations, this is not always the case. Shrinkage in unsaturated polyester resin fabric reinforced composites can manifest itself as cracking, pitting, delamination or dimpling in the finished product. A self-levelling pourable flooring composition based upon unsaturated polyester resin may delaminate or shrink away from walls to leave undesirable gaps. Problems caused by shrinkage of unsaturated polyester resins used in other contexts are numerous and well known.

Chemical additives useful for controlling shrinkage during the curing of polymers such as unsaturated polyester resin systems are in demand. Although many such additives are known, including polyvinyl acetate, thermoplastic homopolymers and copolymers of butadiene, styrene, acrylonitrile, methyl methacrylate and ethylene, the search for new, effective shrink control agents continues. Accordingly, it is an object of the present invention to provide a novel shrink control agent for unsaturated polyester resins, especially when curing is desired at, or below, ambient temperatures.

SUMMARY OF THE INVENTION

The foregoing object has been achieved in the discovery that copolymers of fatty alkyl vinyl esters and short chain vinyl esters are useful and indeed highly effective shrink control agents ("SCA") for curable unsaturated polyester resins. The inventive SCA may be added to the base polyester resin component long before the addition of the polymerization initiator, for example, during manufacture or packaging of the resin, as no degradation of its performance over time has been found. When fillers are to be present in the product, the copolymer SCA is preferably added to the polyester resin at the same time as the polymerization initiator, fillers, and other optional additives, whereupon shrinkage during the subsequent curing reaction is minimized and often totally prevented. The amount of the inventive SCA added is an amount effective to reduce or eliminate shrinkage upon cure.

DETAILED DESCRIPTION

The unsaturated polyester resins are well known and readily available. The unsaturated polyesters themselves are prepared by reacting (copolymerizing) unsaturated acids or anhydrides with polyols, especially alkylene diols or triols. When the term "unsaturated polyester resin" is employed in the art, it is commonly implied that the polyesters are dissolved in a crosslinking unsaturated monomer, although this term as used herein is broad enough to cover both the polyesters themselves and the polyester/crosslinking monomer mixture. Typical acids or anhydrides utilized for preparation of the polyesters include unsaturated dicarboxylic acids such as maleic and fumaric acids and maleic anhydride. Typical polyols are the lower alkyl polyols, typically glycols, such as ethylene and propylene glycol, diethylene glycol, neopentyl glycol (2,2-methylol propane), glycol derivatives of dicyclopentadiene and glycerol. Vinylically unsaturated monomers, especially styrene, are commonly utilized as crosslinking monomers.

To control copolymerization of the polyester with the crosslinking monomer, and final properties, it is usually desirable to limit the number of unsaturated reactive sites in the polyesters. This is accomplished by incorporating substituted or unsubstituted isophthalic acid, substituted or unsubstituted orthophthalic acid, orthophthalic anhydride or substituted orthophthalic anhydride as one of the monomeric constituents of the polyester. The same effect can be achieved by incorporating aliphatic dibasic acids, e.g., adipic or azelaic acid, tetrahydroisophthalic or tetrahydroorthophthalic acid or anhydride into the resin. Further, a combination of aliphatic and aromatic materials also can be used to this effect, depending on the desired final properties. Fire retardant properties may be built into the unsaturated polyester through the use of halogenated monomers, as known in the art, which include halogenated diacids, e.g., HET acid, anhydrides, such as tetrabromo- or tetrachlorophthalic anhydride, and halogenated glycol.

By unsaturated polyester resins, we also include polyester resins in which the unsaturation is located at the chain ends as, for example, vinyl ester resins.

In the present invention water extendable unsaturated polyester resins are particularly preferred. The term "water extendable" means that a water-in-oil emulsion results when water (e.g., up to 60% by weight based on the weight of the resin) is mixed with the resin. In such mixtures, surfactants may be used to promote emulsion stability. The UPE resin optionally may contain built-in detergency to aid in the formation of stable emulsions. For instance, the unsaturated polyester can be modified with conjugated fatty acids, or the acidic end groups of the unsaturated polyester can be neutralized to the carboxylate salt form to aid water extendability. Another technique is to introduce a polymeric glycol such as polyethylene glycol into the structure of the unsaturated polyester to enhance water extendability. Among other benefits, water extension of the polyester resin also aids workability, e.g., when filled with certain particulate fillers, and can greatly lower the overall cost of unsaturated polyester resin-based products. The presence of water also provides the very beneficial effect of reducing the exotherm during cure. Although water addition can reduce the strength of the cured resin product, as it is normally encapsulated as droplets, this can be quite suitably counteracted by the addition of a suitable desiccant. This also counteracts any dimensional changes which result from the slow loss of water. Examples of useful desiccant include calcium oxide, molecular sieves, Portland cement, pozzolan and other hydraulic setting agents.

A free radical (or free radical generating) initiator such as a peroxide or hydroperoxide is used to induce the copolymerization or crosslinking of the unsaturated polyester with the unsaturated crosslinking monomer. Suitable initiators are well known and are exemplified by dibenzoyl peroxide (BPO), cumyl (cumene) hydroperoxide and methyl ethyl ketone peroxide. The initiators are used in minor amount, sufficient to chain extend and crosslink the functional components of the polyester resin composition to provide a thermoset material. For curing at room temperature or below, general practice is to employ a promoter and/or accelerator to speed decomposition of the initiator. Preferred promoters and accelerators include N,N-diethylaniline, N,N-dimethylaniline, N,N-dimethylaniline, N,N-dimethyl-p-toluidine and N,N,N',N'-tetramethylmethylene dianiline (TMMDA) for use with dibenzoyl peroxide, and cobalt naphthenate for use with cumene hydroperoxide or methyl ethyl ketone peroxide. Cobalt neodecanoate or cobalt neodecanoate/bipyridyl complexes represent examples of preferred accelerators useful in combination with dibenzoyl peroxide and an aromatic tertiary amine promoter. The promoter and/or accelerator is used in a minor, effective amount.

As previously mentioned, the shrink control agents are copolymers of fatty alkyl vinyl esters and short chain vinyl esters. By "fatty alkyl vinyl esters" we mean vinyl esters with a fatty alkyl chain of about 9 to about 11 carbon atoms, i.e., those of formula $CH_2$:CHOOC—R wherein R is $C_8$ to about $C_{10}$ alkyl (including straight and branched chain alkyl). By "short chain vinyl esters" we man those vinyl esters of formula $CH_2$:CHOOC—R' wherein R' is $C_1$ to $C_3$. Preferred are copolymers of a vinyl ester of a lower ($C_1$ to $C_3$) monocarboxylic acid and a vinyl ester of a tertiary monocarboxylic acid of $C_9$ to about $C_{11}$. Especially preferred are copolymers of a vinyl ester of a lower monocarboxylic acid and a vinyl ester of a versatic acid or a modified versatic acid ("vinyl versatate"), these copolymers being more accurately expressed as poly(vinyl versatate-covinyl acetate).

The especially preferred subject shrink control agents can, therefore, be defined as vinyl versatate copolymers formed from monomeric units of (a) vinyl versatate or a modified vinyl versatate or mixtures thereof of the structural formula:

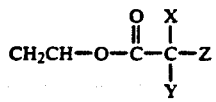

wherein each of X and Y is independently selected from a methyl or ethyl group (preferably each is methyl) and Z is an aliphatic hydrocarbon chain (preferably a straight chain aliphatic hydrocarbon chain) and the sum of the carbon atom content of X, Y and Z is from 7 to 9 (when X and Y are each methyl and Z is a $C_5$ to $C_7$ straight chain aliphatic hydrocarbon (a) equals vinyl versatate, per se) and (b) at least one copolymerizable vinyl monomeric compound, preferably a vinyl ester of a lower, i.e., $C_1$ to $C_3$ monocarboxylic acid with the most preferred co-monomer being vinyl acetate. The monomeric component (a) as described above preferably must be present in at least about 40 mole % and more preferably at least about 50 mole % of the subject SCA copolymer.

The versatic acid, and other similar acid precursors, can be prepared from olefins via the Koch-Haaf synthesis whereby alcohols are treated with carbon monoxide in strong acid to produce the tertiary carboxylic acid. The corresponding vinyl esters may be prepared by reacting the formed acid directly with acetylene.

Certain of the most preferred vinyl versatate copolymers are commercially available. In particular, the preferred SCA product of poly(vinyl versatate-co-vinyl acetate) in various molar ratios are commercially available from Elotex AG, Sempach Station, Switzerland, under the tradename ELOTEX. Normally they are in powder form in which the powder comprises the subject copolymer filled with approximately 10% of an inert particulate carrier, such as talc, calcium carbonate, clay and the like. The powder also contains a protective colloid coating comprised by polyvinyl alcohol and unidentified, special high molecular weight components. The resulting particles range from about 1 to 2 um to about 150 um in size and are readily dispersible in polyester resins as well as in aqueous systems. The particulate solid containing the inventive copolymer is dispersible in unsaturated polyester resin.

As mentioned earlier, the amount of the inventive shrink control agent added to the resin is an amount effective to control, i.e., reduce or eliminate, shrinkage upon cure. The effectiveness of this shrink control agent may vary from particular resin to resin and it is well within routine skill to determine the proper amount. Adding too little of the shrink control agent is not effective, while an excessive addition can cause the product to (usually undesirably) expand during cure. We have found that about 1 to 40% and more preferably 2 to 20% of the shrink control agent, by weight of resin, is useful.

The present vinyl versatate copolymers have unexpectedly been found to give a constant degree of shrinkage control even when exposed to different or fluctuating temperature conditions during cure. Thus, a certain dosage of the present SCA copolymer in a particular polyester system will provide a constant shrinkage control without regard to whether the system is cured at, above or below room temperature or even at fluctuating temperatures during cure. It is only necessary to properly adjust the quantity of the initiator system used. The particular dosage of SCA used will depend upon the unsaturated polyester system, the particular vinyl versatate copolymer used and the desired degree of shrink control or even expansion of the cured system. This dosage can be readily determined in standard manners by the artisan making small trial samples for a particular system.

Polyester resins incorporating the inventive shrink control agent additionally can be filled to give desired properties to the thermoset product. Examples of fillers include clay, talc, gypsum, magnesium oxide, mica and fibers such as mineral, polymeric or glass fibers. Also useful as fillers are the aggregates commonly employed in hydraulic cement mortars and concretes, namely, fine aggregate (such as sand) and coarse aggregate such as crushed stone or gravel. Coloring agents optionally are included in the filler component. Fillers may be used in amounts sufficient to provide the desired results, for example from about 20 to 90% by weight of the filled resin composition.

A major advantage of the present invention is the unexpected compatibility of the cured polyester system when used as a filled coating on a substrate such as concrete.

The term "compatibility" as used means the ability of a layer of filled polyester to remain adhered to a substrate such as concrete without exhibiting breakage or detrimental cracking of the substrate when the coated system is subjected to thermal cycling from +55° C. to −25° C., similar to the French LCPC Std. Test No. NF P 18-894 (12/86).

Use of the present vinyl versatate copolymer unexpectedly imparts a high degree of compatibility to the resultant polyester composite when this composite is coated as a layer on a substrate such as concrete. It is known that concrete has very low tensile strength while polyester resins, such as described with respect to the subject invention, exhibit high tensile strength and good adhesion to the substrate. Due to differences in moduli and thermal expansion rates of the materials, conventional coatings and filled overlays tend to curl and thus impart a high tensile strain on the substrate. This often results in cracking of the substrate or even rupture of the coating or overlay and part of the adjacent substrate from the substrate mass. It is presently found that filled unsaturated polyester resin compositions which include the subject vinyl versatate copolymer do not exhibit (or exhibit fewer of) such detrimental effects when subjected to varying temperature conditions.

When inorganic fillers are present in the subject invention, it is preferred that a coupling agent be applied to the filler to promote adhesion between the filler and the polyester resin. Suitable coupling agents are known in the art as those which promote adhesion between organic and inorganic materials. Typical coupling agents are silanes and titanates. Particularly preferred is gamma-methacryloxypropyltrimethoxysilane.

Also invented are shrinkage-controllable, thermosettable unsaturated polyester resin compositions. These compositions include a water-extendable unsaturated polyester resin including unsaturated polyester and an unsaturated monomer crosslinkable with the unsaturated polyester, for example styrene. These compositions also include an inhibitor adapted to prevent autopolymerization of the resin, for example phenolic compounds such as hydroquinone, methoxy hydroquinone (hydroquinone mono methyl ether), tert butyl hydroquinone, p-benzohydroquinone, ditert butyl-hydroquinone and tolunydroquinone. Optionally, these compositions also may include standard pigments, for example titanium dioxide; known multifunctional coupling agents adapted to promote binding aggregate and unsaturated polyester resin; water, preferably about 0.1 to about 10% by weight; paraffin wax or waxes; air release or wetting aids, for example known compatible surfactants; and polymerization inhibitors such as free radical or free radical generating initiators, for example certain peroxides and hydroperoxides such as dibenzoyl peroxide, cumyl(cumene)hydroperoxide, and methyl ethyl ketone peroxide.

The following examples illustrate the present invention. In these examples, unless otherwise specified, rectangular solids approximately 25 mm × 25 mm × 305 mm in dimension were prepared from various unsaturated polyester resins, the inventive shrink control agent (SCA), a curing agent (initiator and promoter) and other noted ingredients such as additional styrene, fillers and water. The solids were cured at room temperature. Linear shrinkage during the twenty-four hours following pouring of test pieces was measured by a linearly variable differential transformer (LVDT) and is expressed in change in microstrains (u strains) wherein 1,000 u strains equals 0.1% linear shrinkage, i.e., length/original length × 1,000,000. Microstrains in the examples that are preceded by a minus sign indicate that shrinkage of that amount occurred. Similarly, a positive microstrain value indicates that expansion took place. Reproducibility of such measurements is on the order of about ±500–1000 microstrains. Volume shrinkage was determined by density changes in going from the uncured liquid state to the cured solid state 24 hours after initiation of cure.

The standard unsaturated polyester resin employed ("std") is a mixture of two resins designated A and B, the weight ratio of A to B being 1 to 2.

Resin A contains an unsaturated polyester which is a product of a condensation polymerization of the following monomers: propylene glycol (53 to 58 mole %), orthophthalic anhydride (20 to 25 mole %) and maleic anhydride (20 to 25 mole %). Resin A further contains styrene as a solvent for the polyester and as a crosslinking monomer in an amount of 25 to 32 weight percent based on the weight of the polyester. The resin preferably also contains inhibitor to prevent autopolymerization of the mass during storage. Useful inhibitors for this purpose are well known in the art. The final acid number for resin A is 12 to 16 mg KOH/g; the final hydroxyl number is 50 to 70 mg KOH/g.

Resin B is a condensation polymerization product containing the following monomers: diethylene glycol (2.5 to 7 mole %), ethylene glycol (45 to 50 mole %), tetrabromophthalic anhydride (9 to 11 mole %) (to add fire retarding properties to the thermoset product), orthophthalic anhydride (10 to 12 mole %) and maleic anhydride (24 to 28 mole %). Resin B otherwise is analogous to Resin A. The final acid number is 12 to 15 mg KOH/g, the final hydroxyl number is 40 to 55 mg KOH/g.

Another resin employed in evaluating the present invention is designated as Resin C. This is a commercially available product believed to consist of a polyester of orthophthalic acid, maleic acid and neopentyl glycol (molar ratios unknown) dissolved in styrene. The styrene content is stated by the supplier to be about 40 percent by weight of the total.

In the examples, all percentages are by weight and based on the total weight of all the ingredients except where otherwise noted.

EXAMPLE 1

| | % Std. Resin | % SCA | % Added Styrene | Density g/cm$^3$ Initial | Density g/cm$^3$ Final | % V |
| --- | --- | --- | --- | --- | --- | --- |
| 1. | 100 | 0 | 0 | 1.27 | 1.37 | −7.9 |
| 2. | 73.1 | 11.5 | 15.4 | 1.18 | 1.20 | −1.7 |

In Example 1, the standard resin (unfilled) was cured with 2.5% by weight benzoyl peroxide plus 0.15% by weight TMMDA, both based on the weight of the resin. Example 1 shows that the inventive shrink control agent (70/30 copolymer of vinyl versatate and vinyl acetate) reduced shrinkage in the neat resin mixture from 7.9% to 1.7% in trials 1 and 2, respectively.

EXAMPLE 2

| | % SCA | % Added Styrene | % Resin Type | % H₂O | % Filler | Cure L u Strains |
|---|---|---|---|---|---|---|
| 3. | 0 | 0 | 17.1 std | 0 | 82.9 | −5500 |
| 4. | 0 | 0 | 17.9 std | 1.0 | 81.1 | −5600 |
| 5. | 0 | 0 | 17.1 std | 5.2 | 77.7 | −5300 |
| 6. | 2.7+ | 3.6 | 17.1 std | 1.0 | 75.6 | +200 |
| 7. | 2.7* | 3.6 | 17.1 std | 1.0 | 75.6 | −800 |
| 7a. | 2.4° | 3.6 | 17.1 std | 0.7 | 76.2 | −5100 |

*SCA = 50/50 poly(vinyl versatate-covinyl acetate)
+SCA = 70/30 poly(vinyl versatate-covinyl acetate)
°SCA = poly(vinyl versatate)

In Example 2 the effect of the inventive shrink control agent was studied in filled and water extended resin compositions. The filler consisted of, by weight, 69% fine sand coated with b 0.2% silane coupling agent, 28.3% Portland cement, b 1.5% TiO₂ (pigment) and 1% of a BPO/TMMDA initiator/promoter for unsaturated polyester resins and the indicated quantity of SCA. As seen in trials 6 and 7, shrinkage was successfully controlled. Trial 7a. shows that a vinyl versatate homopolymer, compared to the copolymer compositions cited in Example 2, did not reduce shrinkage in an effective manner.

EXAMPLE 3

| | % SCA | % Added Styrene | % Resin Type C | % Filler | Cure L u Strains |
|---|---|---|---|---|---|
| 8. | 0 | 0 | 18.3 | 81.7 | −7500 |
| 9. | 2.5 | 0 | 17.4 | 77.7 | −3200 |
| 10. | 4.9 | 0 | 17.4 | 77.7 | −1000 |

In Example 3, the inventive shrink control agent was tested in unsaturated polyester resin type C. Resin C was not of the water extendable type. The samples of trials 8 and 10 were cured with BPO/TMMDA, while trial 9 employed a cumene hydroperoxide/cobalt naphthenate initiator/promoter curing system. Shrinkage was greatly reduced by the use of the 70/30 (vinyl versatate/vinyl acetate) copolymer.

Example 4 shows how the resin compositions containing the inventive SCA can be cured over a broad range of ambient temperature conditions and still provide compositions of low shrinkage, no shrink or even expansion.

EXAMPLE 4

| | % Std. Resin | % Added Styrene | SCA* | % SCA | Ambient Temp.,°C. | Cure L u Strains |
|---|---|---|---|---|---|---|
| 11. | 16.7 | 3.5 | (1) | 2.6 | 40 | +500 |
| 12. | 16.7 | 3.5 | (2) | 2.6 | 40 | +600 |
| 13. | 16.7 | 3.5 | (1) | 2.6 | 24 | +1300 |
| 14. | 16.7 | 3.5 | (1) | 2.6 | 15 | +1300 |
| 15. | 16.7 | 3.5 | (2) | 2.6 | 15 | +1000 |

*SCA = (1) = 50/50 vinyl versatate/vinyl acetate copolymer
(2) = 70/30 vinyl versatate/vinyl acetate copolymer The advantages of good and predictable shrinkage control over a broad range of ambient temperature conditions will be apparent to those skilled in the art.

In Example 5, trial 17 shows how use of the inventive SCA in a filled, std. resin composition yields materials useful as bonded overlays for concrete due to an unexpected high degree of thermal compatibility. Trial 16 in the example shows that a high level of curing shrinkage and poor compatibility with concrete resulted in the absence of the inventive SCA. In both trials, the overlay thickness was about 6 mm. The usefulness of filled, unsaturated polyester resins containing the inventive SCA in such an application will be appreciated by those skilled in the art.

EXAMPLE 5

| | % Std. Resin | % Added Styrene | SCA* | % SCA | Cure L u Strains | Temp. Cycling Performance** −25 to +55° C. |
|---|---|---|---|---|---|---|
| 16. | 24.8 | 5.2 | — | — | −8600 | Poor; substrate cracked and warped after 3–5 cycles |
| 17. | 21.9 | 4.6 | (1) | 3.5 | +500 | Excellent; no damage or delamination after 28 cycles |

*(1) = 70/30 vinyl versatate/vinyl acetate copolymer
**Cycling of temperature according to LCPIC norm NF P 18-894

The trials of Example 6 further indicate the ability of the copolymer agent to effectively reduce linear shrinkage in isophthalate type of unsaturated polyester resins under ambient temperature conditions of curing; and for another orthophthalate-based, general purpose resin composition. Specimen sizes were about 25 mm × 305 mm × 4 mm, and the L values of the example represent an average value of 3-4 individual specimens. In trials 19 and 20, samples were cured with dibenzoyl peroxide initiator and N,N-diethylaniline promoter. The samples of trial 18 were cured with benzoyl peroxide/TMMDA.

Resin D is a 29% solution in styrene of an unsaturated polyester prepared by condensing isophthalic acid, polycaprolactone diol, neopentyl glycol, diethylene glycol and maleic anhydride.

Resin E is a polycondensation product of isophthalic acid, ethylene glycol, propylene glycol and maleic anhydride. Resin E contains about 28% by weight of styrene.

Resin F is a polycondensation product of orthophthalic anhydride, ethylene glycol, propylene glycol and maleic anhydride. The preferred molar ratio of propylene to ethylene glycols is about 2.2 to 1. Resin F contains about 28% by weight of styrene.

EXAMPLE 6

| | Resin Type | Resin Wt. % | SCA* Wt. % | % Added Styrene | % H₂O | % Filler | Cure L u Strains |
|---|---|---|---|---|---|---|---|
| 18. | D | 30.1 | 4.04 | 0.96 | 3.40 | 61.5 | −800 |
| 19. | E | 40.0 | 1.50 | 15.6 | 1.50 | 41.4 | +670 |
| 20. | F | 38.4 | 1.66 | 15.1 | 1.57 | 43.3 | +510 |

*50/50 poly(vinyl-versatate-co-vinyl acetate)

Although the invention has been described in connection with preferred embodiments and certain examples, it is not so limited. Variations, within the scope of the appended claims, will be apparent to those skilled in the art.

We claim:

1. A shrinkage-controllable, polymerizable resin composition comprising:
   (a) unsaturated polyester resin and (b) a shrinkage-reducing effective amount of copolymer comprising (i) a fatty alkyl vinyl ester of the formula:

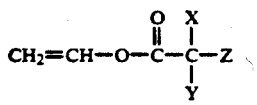

wherein each of X and Y is independently selected from a methyl and ethyl group, Z is an aliphatic hydrocarbon group, and the sum total carbon atom content of X, Y, and Z is from 7 to 9; and (ii) a short chain vinyl ester of the formula $CH_2{:}CHOOCR'$ wherein R' is $C_1$ to $C_3$ alkyl, said fatty alkyl vinyl ester being present in said copolymer (b) in an amount of at least about 40 mole percent.

2. A composition of claim 1 wherein the short chain vinyl ester is vinyl acetate.

3. A composition of claim 1 wherein the copolymer is poly(vinyl versatate-co-vinyl acetate).

4. A composition of claim 3 wherein the molar ratio of vinyl versatate to vinyl acetate is at least about 50:50.

5. A composition of claim 3 wherein the molar ratio of vinyl versatate to vinyl acetate is about 70:30.

6. A composition of claim 1 comprising about 1 to about 40 percent by weight of (b) based on the weight of (a).

7. A composition of claim 1 comprising about 2 to about 20 percent by weight of (b) based on the weight of (a).

8. A composition of claim 1 wherein the unsaturated polyester resin comprises a polymerized product of one or more diacids or anhydrides selected from the group consisting of substituted or unsubstituted orthophthalic acid, isophthalic acid, orthophthalic anhydride, adipic acid, azelaic acid, tetrahydroorthophthalic acid, tetrahydroorthophthalic acid, fumaric acid, maleic acid, maleic anhydride, tetrabromoorthophthalic anhydride, HET acid and halogenated aromatic or aliphatic diacids or anhydrides; and one or more glycols selected from the group consisting of ethylene glycol, propylene glycol, neopentyl glycol, diethylene glycol, dipropylene glycol, halogenated glycol, glycol derivatives of dicyclopentadiene, polycaprolactone diol, polyethylene glycol, polypropylene glycol and glycerol.

9. A composition of claim 1 wherein the unsaturated polyester resin comprises a polymerized product of orthophthalic anhydride, propylene glycol, and maleic anhydride.

10. A composition of claim 1 wherein the unsaturated polyester resin comprises a polymerized product of ethylene glycol, diethylene glycol, orthophthalic anhydride, tetrabromophthalic anhydride, and maleic anhydride.

11. A composition of claim 1 wherein the unsaturated polyester resin comprises a polymerization product of orthophthalic acid or anhydride, maleic acid or anhydride and neopentyl glycol.

12. A composition of claim 1 wherein the unsaturated polyester resin comprises a polycondensation product of ethylene glycol, propylene glycol, orthophthalic anhydride or acid, and maleic anhydride or acid.

13. A composition of claim 1 wherein the unsaturated polyester resin comprises a polycondensation product of ethylene glycol, propylene glycol, isophthalic acid, and maleic anhydride or acid.

14. A composition of claim 1 wherein the unsaturated polyester resin comprises the polymerized product dissolved in an unsaturated monomer which is crosslinkable with said polymerized product.

15. A composition of claim 14 wherein the unsaturated monomer is styrene.

16. A composition of claim 14 wherein the unsaturated monomer comprises substituted styrene; mono-, di- or triacrylate or methacrylate; or diallylphthalate.

17. A composition of claim 19 comprising about 20 to about 60% unsaturated monomer based on the weight of the polymerized product.

18. A shrink resistant polymerizable polyester resin composition comprising unsaturated polyester resin and a shrinkage controlling effective amount of a shrink control agent consisting essentially of a copolymer containing, on a mole basis, about 70% vinyl versatate and about 30% vinyl acetate on a particulate carrier therefor.

19. A shrink resistant polymerizable polyester resin composition comprising unsaturated polyester resin and a shrinkage controlling effective amount of a shrink control agent consisting essentially of a copolymer containing, on a mole percent basis, about 50% vinyl versatate and about 50% vinyl acetate on a particulate carrier therefor.

20. A shrinkage-controllable, thermosettable unsaturated polyester resin composition comprising:
(a) water-extendable unsaturated polyester resin comprising unsaturated polyester and an unsaturated monomer crosslinkable with the unsaturated polyester;
(b) an inhibitor adapted to prevent autopolymerization of the resin;
(c) a shrink control agent comprising (i) a fatty alkyl vinyl ester of the formula:

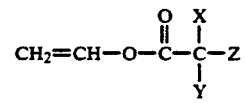

wherein each of X and Y is independently selected from a methyl and ethyl group, Z is an aliphatic hydrocarbon group, and the sum total carbon atom content of X, Y, and Z is from 7 to 9; and (ii) a short chain vinyl ester of the formula $CH_2{:}CHOODCR'$ wherein R' is $C_1$ to $C_3$ alkyl, said fatty alkyl vinyl ester being present in said copolymer (c) in an amount of at least about 40 mole percent; and
(d) filler.

21. A composition of claim 20 comprising, by weight:
(a) about 7 to about 65% unsaturated polyester resin;
(b) 0.025 to about 0.10% polymerization inhibitor based on the weight of unsaturated polyester resin;
(c) about 0.05 to about 10% of the copolymer shrinkage control agent; and
(d) about 20% to about 90% filler.

22. A composition of claim 21 wherein the filler comprises fine filler and/or coarse aggregate and a desiccant.

23. A composition of claim 22 wherein the fine filler is selected from fine sand; low density fly ash; silica flour, aluminum trihydrate; calcium carbonate; clay, glass or ceramic microballoons; and zeolites.

24. A composition of claim 22 wherein the coarse aggregate is selected from coarse sand; and metallic particles of spherical, flake, or irregular shape.

25. A composition of claim 22 wherein the desiccant comprises Portland cement.

26. A composition of claim 22 further comprising pigment.

27. A composition of claim 22 wherein said pigment comprises $TiO_2$.

28. A composition of claim 22 wherein fine filler and/or coarse aggregate includes a coating comprising a multifunctional coupling agent adapted to promote bonding between the fine filler and/or coarse aggregate and the unsaturated polyester resin.

29. A composition of claim 28 wherein the coupling agent comprises gamma-methacryloxypropyltrimethoxysilane.

30. A composition of claim 20 further comprising about 0.1 to about 10% by weight of water.

31. A composition of claim 20 further comprising about 0.1 to about 0.8% based on the weight of unsaturated polyester resin of one or more paraffin waxes melting within the temperature range of less than 80° C. but greater than 50° C.

32. A composition of claim 20 further comprising an air release or wetting aid.

33. A thermoset polyester product of a composition of claim 20 and a polymerization initiator system.

34. A cured product of claim 33 wherein said polymerization initiator system is comprised essentially by dibenzoyl peroxide and a minor amount of N,N-diethylaniline.

* * * * *